(12) United States Patent
Arai

(10) Patent No.: US 10,119,669 B2
(45) Date of Patent: Nov. 6, 2018

(54) VEHICLE LAMP

(71) Applicant: Koito Manufacturing Co., Ltd., Tokyo (JP)

(72) Inventor: Hajime Arai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1 day.

(21) Appl. No.: 15/469,678

(22) Filed: Mar. 27, 2017

(65) Prior Publication Data

US 2017/0292668 A1   Oct. 12, 2017

(30) Foreign Application Priority Data

Apr. 6, 2016   (JP) .................................. 2016-076760

(51) Int. Cl.

| | |
|---|---|
| *F21V 5/00* | (2018.01) |
| *F21S 41/26* | (2018.01) |
| *B60Q 1/068* | (2006.01) |
| *F21S 41/19* | (2018.01) |
| *F21S 41/147* | (2018.01) |
| *F21S 41/32* | (2018.01) |
| *F21S 41/36* | (2018.01) |
| *F21S 41/40* | (2018.01) |
| *F21S 45/49* | (2018.01) |

(Continued)

(52) U.S. Cl.
CPC ............ *F21S 41/26* (2018.01); *B60Q 1/0683* (2013.01); *F21S 41/147* (2018.01); *F21S 41/192* (2018.01); *F21S 41/321* (2018.01); *F21S 41/36* (2018.01); *F21S 41/40* (2018.01); *F21S 45/47* (2018.01); *F21S 45/49* (2018.01); *F21S 41/365* (2018.01)

(58) Field of Classification Search
CPC .............. F21S 48/1109; F21S 48/1104; F21S 48/1388; F21S 48/1159; F21S 48/125; F21S 41/26; F21S 41/147; F21S 41/192; F21S 41/321; F21S 45/47; F21S 45/49; F21S 41/40; F21S 41/36; F21S 41/365; F21S 41/25; F21S 41/29; F21S 41/39; F21S 41/657; F21S 41/65; B60Q 1/0683; B60Q 1/0041; B60Q 1/0483; B60Q 1/2623; B60Q 1/2638; B60Q 1/2649; B60Q 1/2642; B60Q 1/245; B60Q 1/1438; B60Q 1/06; B60Q 1/0433; H01L 25/0753; F21W 2107/10; F21Y 2103/10
USPC ..... 362/520, 465, 39, 41, 43, 529, 538, 544, 362/549, 532
See application file for complete search history.

(56) References Cited

U.S. PATENT DOCUMENTS

2007/0183168 A1* 8/2007 Naganawa ............. B60Q 1/085
362/545

FOREIGN PATENT DOCUMENTS

JP       2005-166590 A      6/2005

* cited by examiner

*Primary Examiner* — Evan Dzierzynski
*Assistant Examiner* — Omar Rojas Cadima
(74) *Attorney, Agent, or Firm* — Abelman, Frayne & Schwab

(57) ABSTRACT

The present disclosure provides a vehicle lamp including: a main bracket pivotably supported to a lamp body; and a sub-bracket pivotably supported to the main bracket. A first optical unit is supported directly to the main bracket, and three second optical units are supported to the main bracket via the sub-bracket. An optical axis adjustment for the first optical unit and the three second optical units is collectively performed by pivoting of the main bracket, and an optical (Continued)

axis deviation between the first optical unit and the three second optical units is corrected by pivoting of the sub-bracket.

12 Claims, 8 Drawing Sheets

(51) Int. Cl.
*F21S 45/47* (2018.01)
*F21S 41/365* (2018.01)

VEHICLE LAMP

CROSS-REFERENCE TO RELATED APPLICATIONS

This application is based on and claims priority from Japanese Patent Application No. 2016-076760, filed on Apr. 6, 2016, with the Japan Patent Office, the disclosure of which is incorporated herein in its entirety by reference.

TECHNICAL FIELD

The disclosure relates to a vehicle lamp provided with a plurality of optical units.

BACKGROUND

Conventionally, there has been known a vehicle lamp which is configured to form a predetermined light distribution pattern by light emitted from a plurality of optical units.

In addition, as the configuration of the vehicle lamp, there is also known a configuration in which a main bracket supporting the plurality of optical units is pivotably supported to a lamp body.

Japanese Laid-Open Patent Publication No. 2005-166590 discloses a configuration of a vehicle lamp in which each optical unit is pivotably supported to the main bracket.

SUMMARY

In the vehicle lamp disclosed in Japanese Laid-Open Patent Publication No. 2005-166590, an optical axis adjustment for the plurality of optical units may be collectively performed by pivoting the main bracket with respect to the lamp body, and an optical axis deviation among the optical units may be corrected by pivoting each of the optical units with respect to the main bracket. Accordingly, the optical axis adjustment for the plurality of optical units may be accurately performed.

However, when this configuration is adopted, it is difficult to implement a compact configuration of a vehicle lamp because it is necessary to secure a space for the pivoting of the individual optical units among the optical units.

The present disclosure has been made in consideration of the foregoing, and an object of the present disclosure is to provide a vehicle lamp provided with a plurality of optical units in which an optical axis adjustment for the plurality of optical units may be accurately performed with the compact configuration of the vehicle lamp.

The present disclosure achieves the above-described object by adopting a configuration including a predetermined sub-bracket.

That is, the vehicle lamp according to the present disclosure includes: a main bracket pivotably supported to a lamp body; a plurality of optical units supported to the main bracket; and a sub-bracket pivotably supported to the main bracket, wherein a predetermined light distribution pattern is formed by light emitted from the plurality of optical units, the plurality of optical units include a first optical unit and a plurality of second optical units, and one side of the first optical unit and the plurality of second optical units is supported directly to the main bracket, and the other side is supported to the main bracket via the sub-bracket.

A type of the "predetermined light distribution pattern" is not specifically limited, and for example, a light distribution pattern for forming a low beam light distribution pattern or a part thereof, a light distribution pattern for forming a high beam light distribution pattern or a part thereof, a light distribution pattern for a daytime running lamp, or a light distribution pattern for a fog lamp may be adopted.

A specific configuration of each of the "optical units" is not specifically limited, and for example, light emitted from a light source may be directly irradiated or controlled by, for example, a reflector or a lens.

A specific configuration of the "main bracket" is not specifically limited as long as the main bracket is a member pivotably supported to the lamp body. Further, a specific pivoting direction at the pivoting time is not also specifically limited.

A specific configuration of the "sub-bracket" is not specifically limited as long as the sub-bracket is a member pivotably supported to the main bracket. Further, a specific pivoting direction at the pivoting time is not also specifically limited.

In the vehicle lamp according to the present disclosure, since the plurality of optical units are supported to the main bracket pivotably supported to the lamp body, an optical axis adjustment for the plurality of optical units may be collectively performed by pivoting the main bracket.

In the vehicle lamp according to the present disclosure, the sub-bracket is pivotably supported to the main bracket. Further, one side of the first optical unit and the plurality of second optical units that constitute the plurality of optical units is supported directly to the main bracket, and the other side is supported to the main bracket via the sub-bracket. Thus, the following acting effects may be obtained.

That is, an optical axis deviation between the first optical unit and the plurality of second optical units may be corrected by pivoting the sub-bracket. Accordingly, the main bracket may be assembled in the lamp body in a state where the optical axis adjustment for the plurality of optical units has been accurately performed.

Further, since the optical axis adjustment for the plurality of second optical units is collectively performed, the necessity to secure a space for the pivoting of the individual second optical units among the second optical units may be eliminated. Thus, the spacing among the second optical units may be made narrow, and as a result, a compact vehicle lamp may be implemented.

As described above, according to the present disclosure, in the vehicle lamp provided with the plurality of optical units, the optical axis adjustment for the plurality of optical units may be accurately performed with the compact configuration of the vehicle lamp.

In the above-described configuration, when the plurality of second optical units are arranged such that at least one second optical unit irradiates light in a direction different from that of the other second optical units, light distribution patterns formed by light irradiated from the plurality of second optical units may expand. As a result, the predetermined light distribution pattern may be easily formed.

At this time, when the plurality of second optical units are supported to the sub-bracket, and furthermore, projection lenses are disposed in front of the second optical units, respectively, in a state of being supported to the main bracket, it is required to maintain an incident position where light emitted from each of the second optical units is incident on each of the projection lenses to be as constant as possible, regardless of the pivoting state of the sub-bracket, in order to maintain a light distribution pattern formed by the light irradiated from each of the second optical units in a substantially constant shape.

Accordingly, in this case, when the sub-bracket is pivoted with respect to the main bracket about an axis extending in a direction perpendicular to a direction positioned in the middle of a plurality of light irradiation directions from the plurality of second optical units, the incident position where the light emitted from each of the optical units is incident on each of the projection lens may be maintained as a substantially constant position.

The "direction positioned in the middle of a plurality of light irradiation directions from the plurality of second optical units" is not specifically limited as long as it is a direction positioned between light irradiation directions from two second optical units set to irradiate light in light irradiation directions which are the farthest from each other.

In the above-described configuration, when light emitted from the first optical unit forms a central zone of the predetermined light distribution pattern, the predetermined light distribution pattern may be easily formed as a practically appropriate light distribution pattern even though an optical axis deviation occurs among the second optical units.

Especially, when a low beam light distribution pattern is formed as the predetermined light distribution pattern, with the configuration where the light emitted from the first optical unit forms the central zone of the low beam light distribution pattern, the low beam light distribution pattern may be easily formed as a practically appropriate light distribution pattern while suppressing a glare from being given to, for example, an oncoming car driver.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described by using the drawings.

Figure 1:
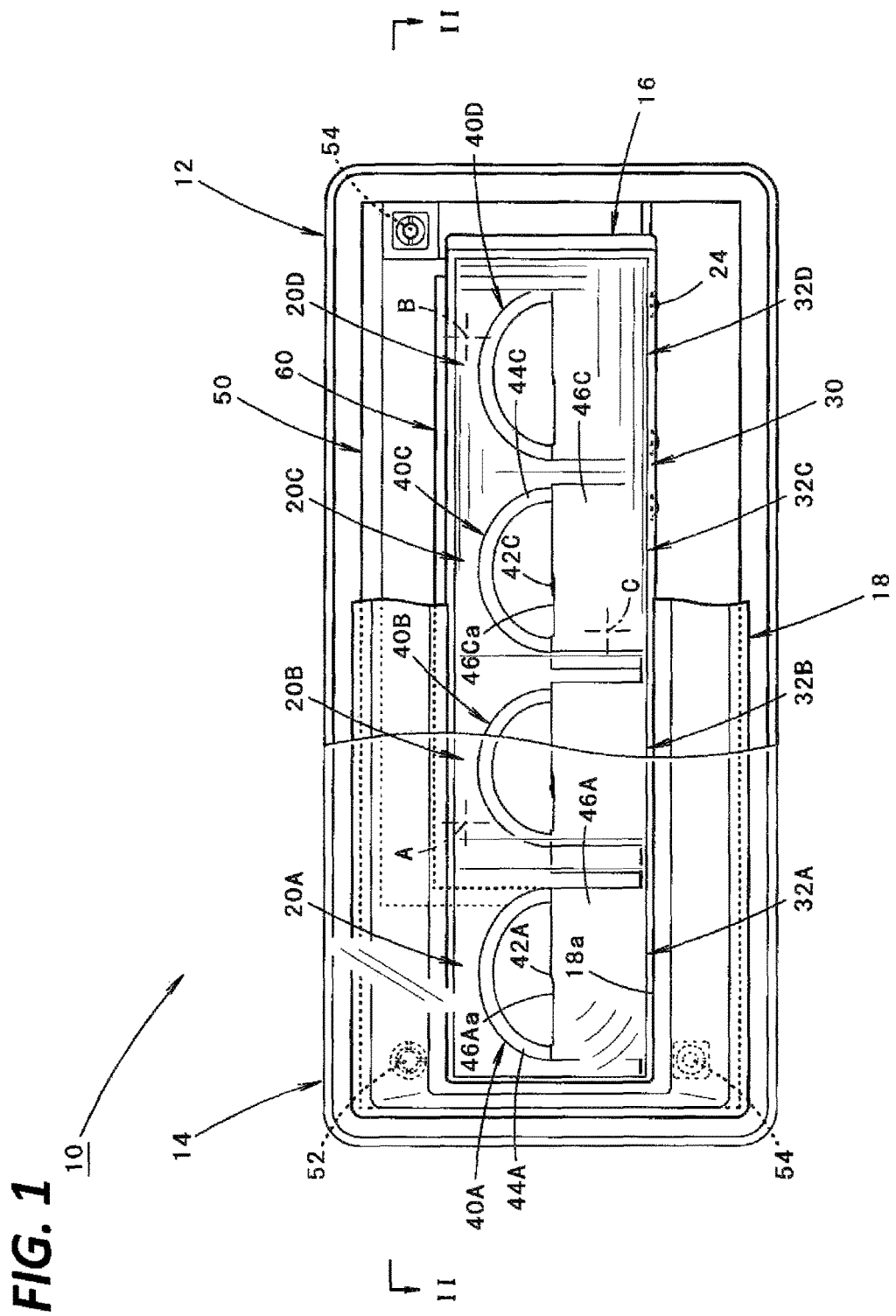
FIG. 1 is a front view illustrating a vehicle lamp according to an exemplary embodiment of the present disclosure.
Figure 2:
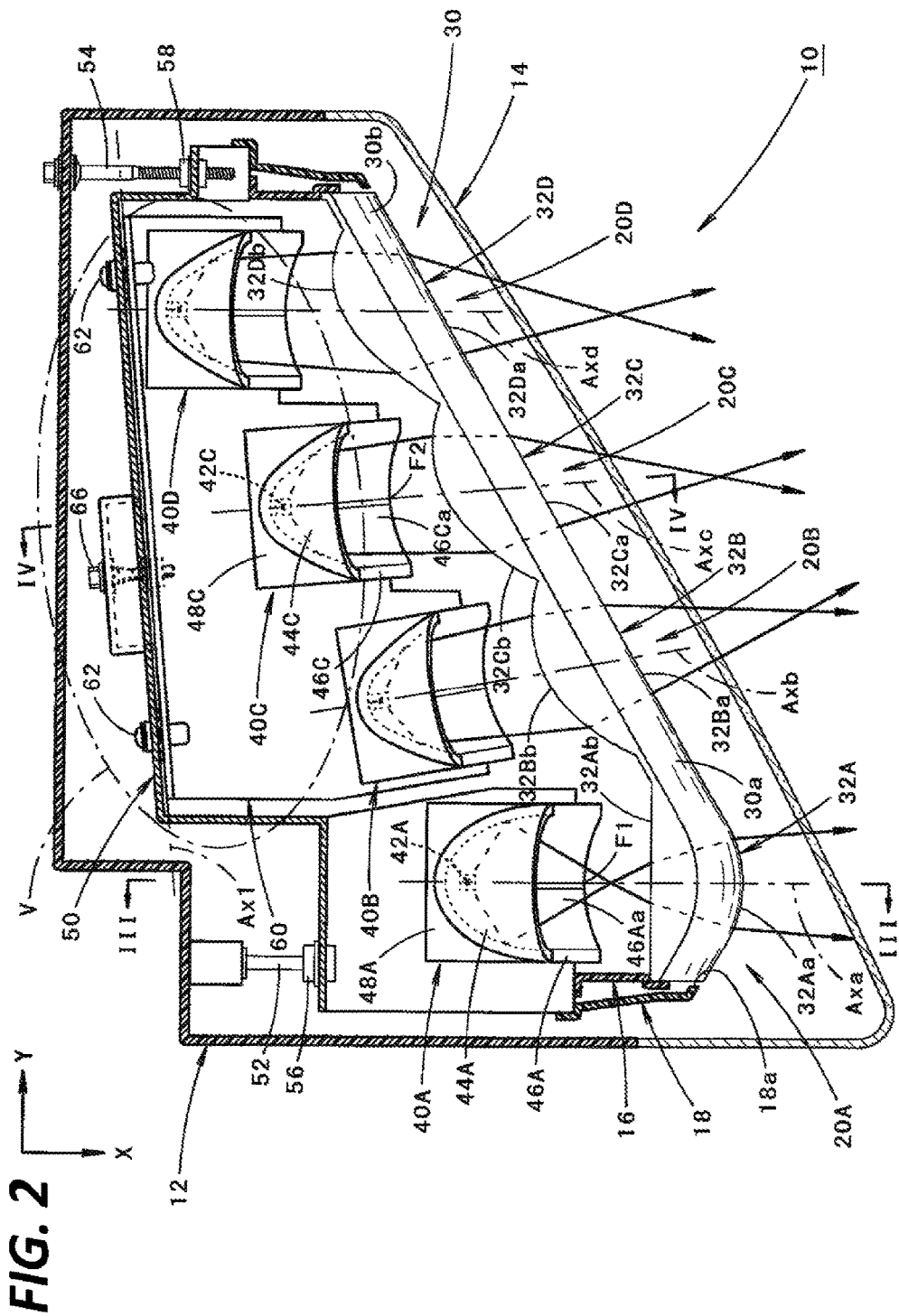
FIG. 2 is a sectional view taken along the line II-II in FIG. 1.

FIG. 1 is a front view illustrating a vehicle lamp 10 according to an exemplary embodiment of the present disclosure. FIG. 2 is a sectional view taken along the line II-II of FIG. 1.

As illustrated in FIGS. 1 and 2, the vehicle lamp 10 according to the present exemplary embodiment is a head lamp disposed at the left front end of a vehicle and is configured to form a low beam light distribution pattern.

In the vehicle lamp 10 illustrated in FIG. 2, the direction indicated by X is a "forward direction" (a "forward direction" from the position of the vehicle as well), and the direction indicated by Y is a "leftward direction" perpendicular to the "forward direction" (a "leftward direction" from the position of the vehicle as well but a "rightward direction" when viewed from the front side of the lamp).

The vehicle lamp 10 is configured such that a first lamp unit 20A and three second lamp units 20B, 20C, and 20D are accommodated side by side in the vehicle width direction inside a lamp chamber formed by a lamp body 12 and a transparent light transmitting cover 14 attached to a front opening of the lamp body 12. The three second lamp units 20B, 20C, and 20D are arranged in this order to be gradually displaced rearwardly toward the outward side in the vehicle width direction, in comparison with the first lamp unit 20A.

The light transmitting cover 14 is formed to extend obliquely rearwardly toward the outward side in the vehicle width direction.

Inside the vehicle chamber, a main bracket 50 pivotably supported to the lamp body 12 and a sub-bracket 60 pivotably supported to the main bracket 50 are arranged.

The first lamp unit 20A is provided with a first projection lens 32A and a first optical unit 40A disposed behind the first projection lens 32A. The second lamp units 20B, 20C, and 20D are provided with second projection lenses 32B, 32C, and 32D and second optical units 40B, 40C, and 40D disposed behind the second projection lenses 32B, 32C, and 32D, respectively.

The first projection lens 32A and the three second projection lenses 32B, 32C, and 32D are configured as a single transparent member 30.

The transparent member 30 is disposed to extend along the horizontal plane and has an external appearance of a horizontally long rectangle shape when viewed from the front side of the lamp.

The outer peripheral edge of the transparent member 30 is supported by a lens holder 16. The left and right opposite ends of the lens holder 16 are supported to the main bracket 50.

An extension member 18 is disposed at the outer peripheral side of the lens holder 16 to cover the corresponding lens holder 16. The extension member 18 has a front end opening 18a that surrounds the corresponding transparent member 30 with a substantially constant gap from the transparent member 30 when viewed from the front side of the lamp. The rear end of the extension member 18 is supported to the main bracket 50.

The main bracket 50 is supported to be vertically and horizontally pivotable with respect to the lam body 12, by a pivot 52 disposed at the right upper side of the lamp body 12 (the left upper side when viewed from the front side of the lamp) and two aiming screws 54 disposed at the left upper side and the right lower side of the lam body 12, respectively.

In addition, the base end of the pivot 52 is fixed to the lamp body 12, and the tip end thereof is fitted with a spherical step bearing 56 mounted on the main bracket 50. Each aiming screw 54 is pivotably supported to the lamp body 12 at the base end thereof, and the tip end of the aiming screw 54 is screw-coupled with an aiming nut 58 mounted on the main bracket 50.

Next, a detailed configuration of the first lamp unit 20A will be described.

Figure 3:
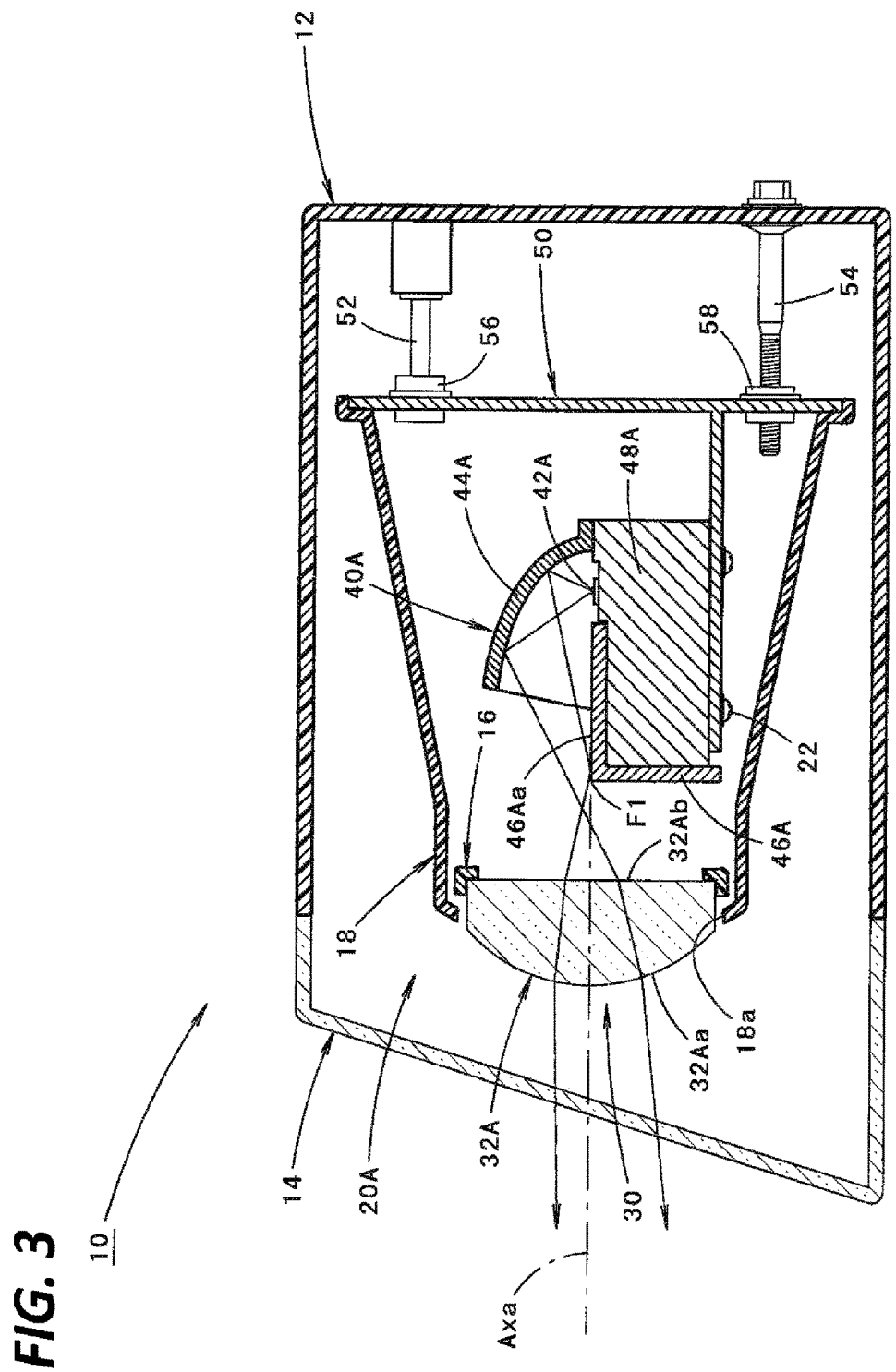
FIG. 3 is a sectional view taken along the line in FIG. 2.

FIG. 3 is a sectional view taken along the line of FIG. 2.

As illustrated in FIG. 3, the first projection lens 32A of the first lamp unit 20A has an optical axis Axa extending in the front and rear direction of the vehicle.

The first optical unit 40A includes a light source 42A disposed behind a rear focal point F1 of the first projection lens 32A, a reflector 44A reflecting light emitted from the light source 42A toward the first projection lens 32A, a shade 46A shading a portion of the light reflected from the reflector 44A, and a base member 48A supporting the light source 42A, the reflector 44A, and the shade 46A.

The light source 42A is a white light emission diode having a rectangular light emitting surface and is supported on the base member 48A in a state where the light emitting surface faces upward. The reflector 44A is disposed to cover the light source 42A from the upper side. The shade 46A has an upward reflecting surface 46Aa that reflects a portion of the light reflected from the reflector 44A upward so as to be incident on the first projection lens 32A. The front edge of the upward reflecting surface 46Aa is formed to extend laterally from the rear focal point F1.

In the first optical unit 40A, the base member 48A is screw-connected and fixed to the main bracket 50 by a plurality of screws 22. The base member 48A is configured to also function as a heat sink.

Next, detailed configurations of the second lamp units 20B, 20C, and 20D will be described.

As illustrated in FIG. 2, in the second lamp unit 20D disposed at the outermost side in the vehicle width direction among the three second lamp units 20B, 20C, and 20D, an optical axis Axd of the second projection lens 32D extends in the front and rear direction of the vehicle. In the second lamp unit 20C inwardly adjacent to the second lamp unit 20D in the vehicle width direction, an optical axis Axc of the second projection lens 32C extends in a direction inclined outwardly in the vehicle width direction toward the front side of the vehicle in the front and rear direction of the vehicle (in a direction inclined, for example, about 5° from the front and rear direction of the vehicle). In the second lamp unit 20B inwardly adjacent to the second lamp unit 20C in the vehicle width direction, an optical axis Axb of the second projection lens 32B extends in a direction further inclined outwardly in the vehicle width direction toward the front side of the vehicle in the front and rear direction of the vehicle (in a direction inclined, for example, about 10° from the front and rear direction of the vehicle).

In the second lamp units 20B, 20C, and 20D, the second optical units 40B, 40C, and 40D have the same configuration.

Accordingly, hereinafter, the configuration of the second optical unit 40C will be described by describing the second lamp unit 20C as an example.

Figure 4:
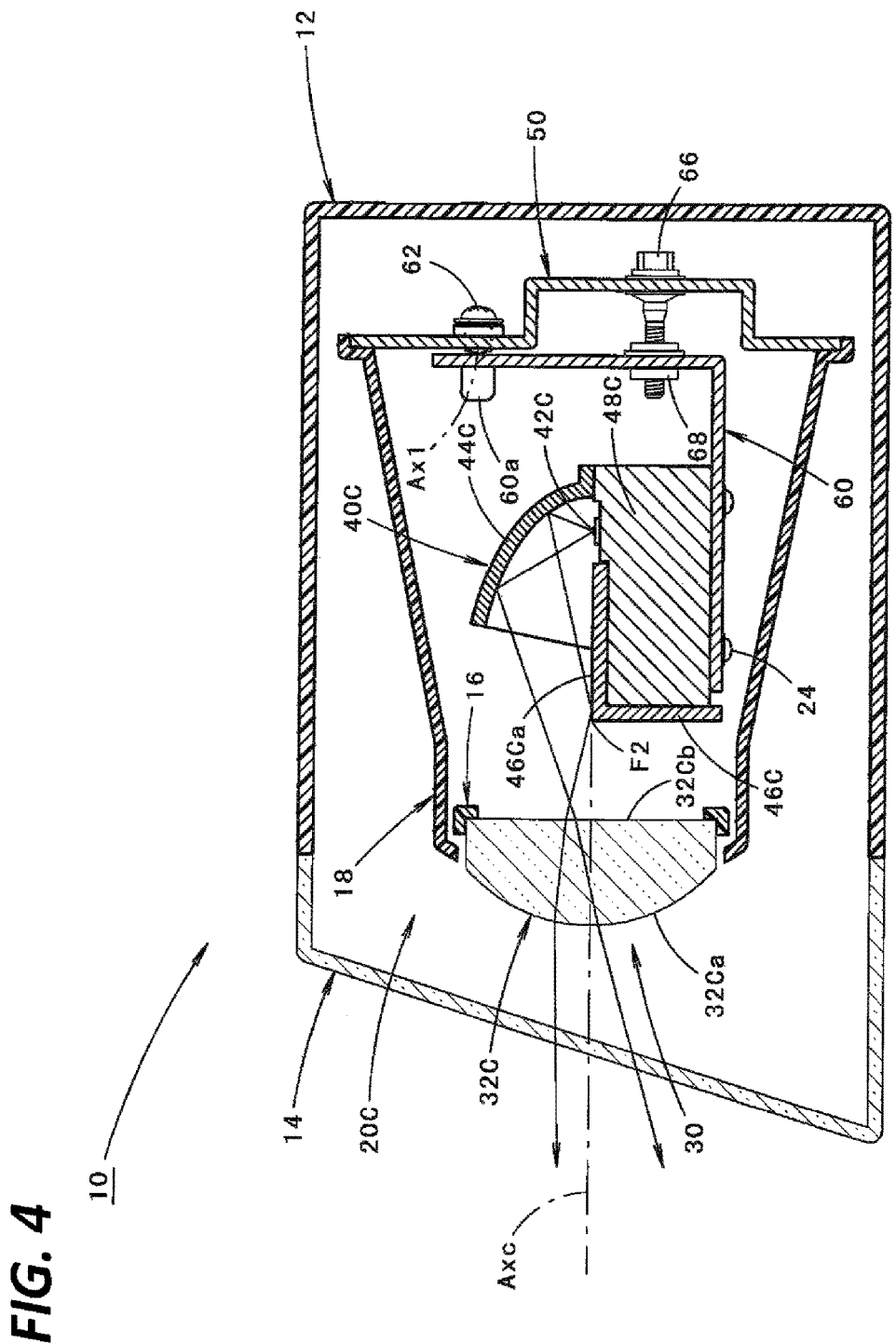
FIG. 4 is a sectional view taken along the line IV-IV in FIG. 2.

FIG. 4 is a sectional view taken along the line IV-IV of FIG. 2.

As illustrated in FIG. 4, the second optical unit 40C is provided with a light source 42C disposed behind a rear focal point F2 of the projection lens 32C, a reflector 44C reflecting light emitted from the light source 42C toward the projection lens 32C, a shade 46C shading a portion of the light reflected from the reflector 44C, and a base member 48C supporting the light source 42C, the reflector 44C, and the shade 46C.

The light source 42C is a white light emitting diode having a rectangular light emitting surface and is supported on the base member 48C in a state where the light emitting surface faces upward. The reflector 44C is disposed to cover the light source 42C from the upper side. A shape of the reflecting surface of the reflector 44C is set such that a convergence degree of light emitted from the light source 42C and reflected in the corresponding reflector 44C is smaller than a convergence degree of light emitted from the light source 42A and reflected in the reflector 44A of the first lamp unit 20A. The shade 46A has an upward reflecting surface 46Ca that reflects a portion of the light reflected from the reflector 44C upward so as to be incident on the projection lens 42C. The front edge of the upward reflecting surface 46Ca is formed to extend laterally from the rear focal point F2.

In the second optical unit 40C, the base member 48C is screw-connected and fixed to the sub-bracket 60 by a plurality of screws 24. The base member 48C is configured to also function as a heat sink.

Figure 5:
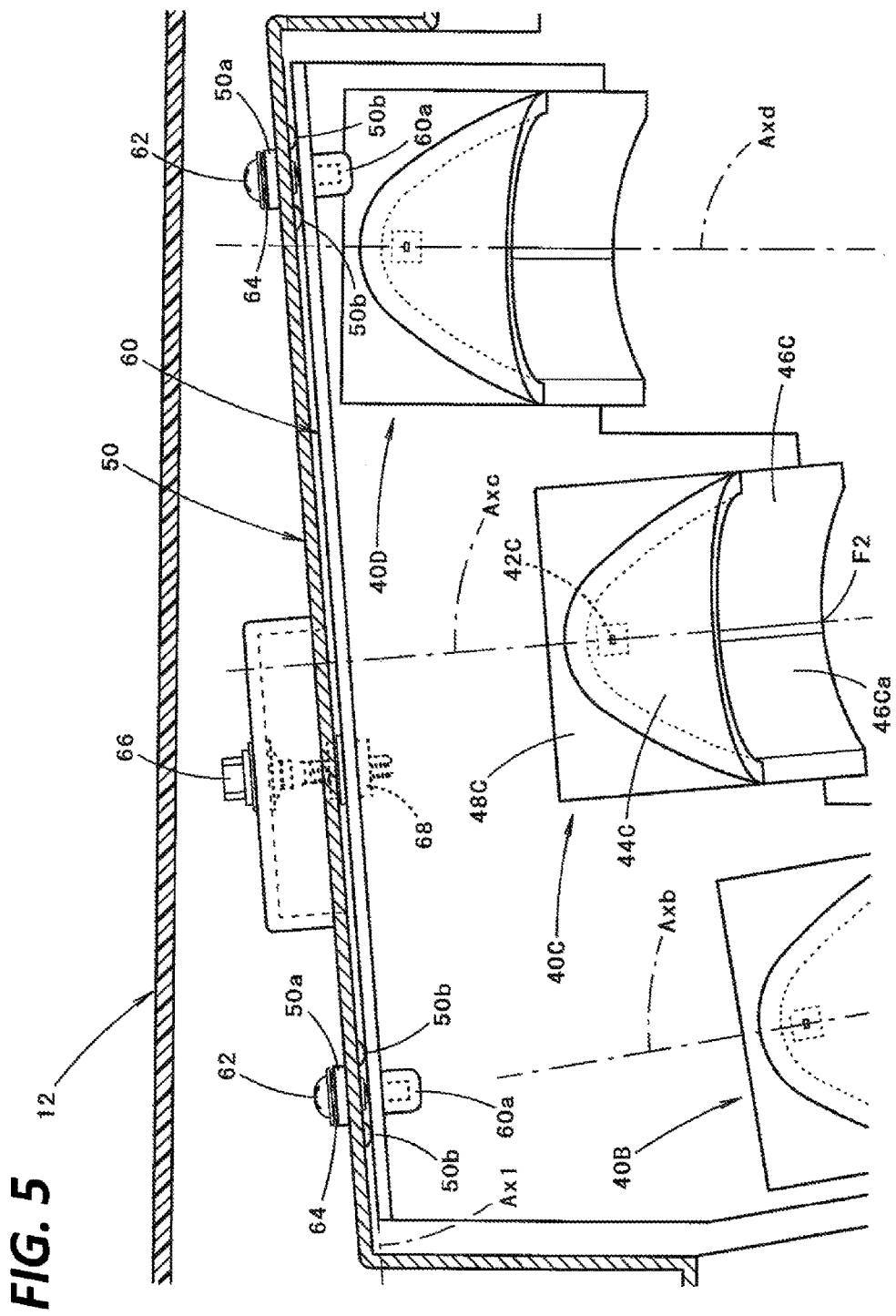
FIG. 5 is a large-scale view of the portion V in FIG. 2.

FIG. 5 is a large-scale view of the portion V in FIG. 2.

As illustrated in FIG. 5, the sub-bracket 60 is supported to be pivotable vertically with respect to the main bracket 50 about a horizontally extending pivoting axis Ax1. The pivoting axis Ax1 extends in a direction perpendicular to the optical axis Axc of the second projection lens 32C (i.e., in a direction inclined to the rear side of the vehicle toward the outward side in the vehicle width direction).

The sub-bracket 60 is connected to the main bracket 50 by screw connection at two places positioned above the three optical axes Axb, Axc, and Axd and in the extending direction of the pivoting axis Ax1 (as indicated by points A and B in FIG. 1).

Each of screws 62 used for the screw connection is mounted with a wave washer 64 that is elastically deformable in the direction of the screw connection.

Sleeves 50a are formed at two places on the main bracket 50 in the extending direction of the pivoting axis Ax1. The sleeves 50a are formed to protrude rearwardly from the main bracket 50, and the inner peripheral surface of each sleeve 50a constitutes an insertion hole through which the screw 62 is inserted.

Protrusions 50b are formed at four places on the main bracket 50 in the extending direction of the pivoting axis Ax1, to be in contact with the sub-bracket 60 thereby causing the sub-bracket 60 to be vertically pivoted. Among the four protrusions 50b, one pair is formed near the opposite sides of one of the insertion holes, respectively, in the extending direction of the pivoting axis Ax1, and the other pair is formed near the opposite sides of the other insertion hole, respectively, in the extending direction of the pivoting axis Ax1. The protrusions 50b have a substantially hemispherical shape and are formed in the same size.

Bosses 60a are formed at two places on the sub-bracket 60 in the extending direction of the pivoting axis Ax1 to fix the screws 62 by being screw-connected with the screw portions of the screws 62.

Meanwhile, an adjusting screw 66 is provided at a position below the three optical axes Axb, Axc, and Axd to vertically pivot the sub-bracket 50 with respect to the main bracket 50 about the pivoting axis Ax1 (the position of the adjusting screw 66 is indicated by a point C in FIG. 1).

The adjusting screw 66 is pivotably supported to the main bracket 50 at the base end thereof, and the tip end of the adjusting screw 66 is screw-connected with an adjusting nut 68 mounted on the sub-bracket 60.

By operating the adjusting screw 66 to pivot the sub-bracket 60, a vertical optical axis deviation between the first optical unit 40A and the three second optical units 40B, 40C, and 40D may be corrected. This operation may be performed at a stage before the main bracket 50 is assembled in the lamp body 12.

In addition, the main bracket 50 is formed such that the portion of the main bracket 50 which supports the base end of the adjusting screw 66 is displaced rearwardly in comparison with the sleeves 50*a*.

Next, a configuration of the transparent member 30 will be described.

Figure 6:
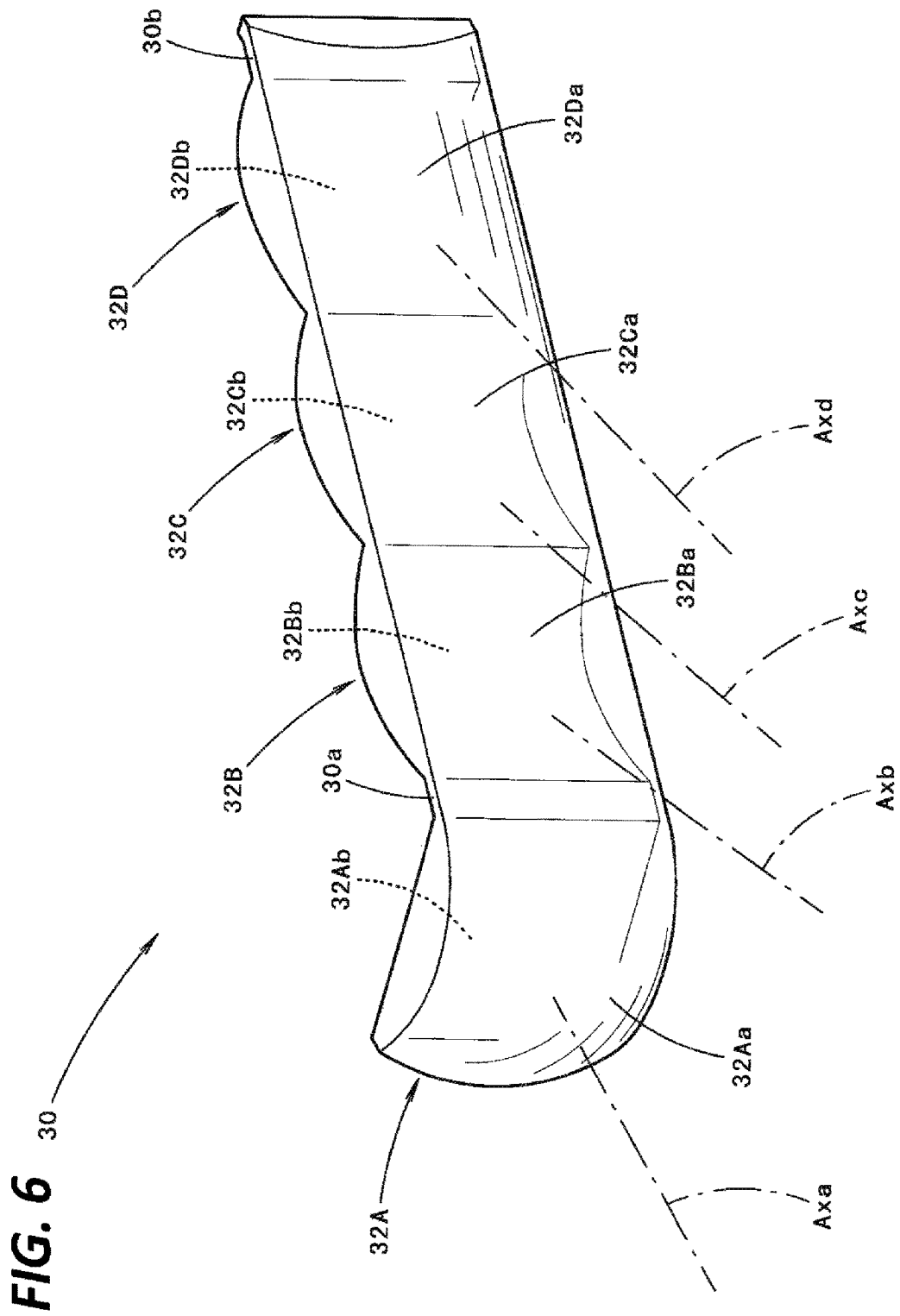
FIG. 6 is a perspective view illustrating a transparent member of the vehicle lamp as a single article.

FIG. 6 is a perspective view illustrating the transparent member 30 as a single article.

As illustrated in FIG. 6, in the front surface of the transparent member 30, the portions constituting the front surfaces 32Ba, 32Ca, and 32Da of the second projection lenses 32B, 32C, and 32D are configured by a single convex cylindrical surface that extends obliquely rearwardly toward the outward side in the vehicle width direction, and the portion constituting the front surface 32Aa of the first projection lens 32A is configured by a convex curved surface that is continuous to the convex cylindrical surface and is bent around rearwardly toward the inward side in the vehicle width direction.

In the rear surface of the transparent member 30, the portions constituting the rear surface 32Bb, 32Cb, and 32Db of the second projection lenses 32B, 32C, and 32D are configured by convex cylindrical surfaces that extend individually vertically, respectively, and the portion constituting the rear surface 32Ab of the first projection lens 32A is configured by a plane surface perpendicular to the optical axis Axa.

The convex cylindrical surfaces constituting the rear surfaces 32Bb, 32Cb, and 32Db of the second projection lenses 32B, 32C, and 32D are formed with curvatures according to the directions of the optical axes Axb, Axc, and Axd of the second projection lenses 32B, 32C, and 32D, respectively.

In addition, in the transparent member 30, a connection portion 30*a* is formed between the first projection lens 32A and the second projection lens 32B, and an extension portion 30*b* is formed at the outward side from the second projection lens 32D in the vehicle width direction. The front surfaces of the connection portion 30*a* and the extension portion 30*b* are configured by convex cylindrical surfaces which are identical to that of the front surfaces 32Bb, 32Ca, and 32Da of the second projection lenses 32B, 32C, and 32D, and the rear surfaces thereof are configured by vertical surfaces extending obliquely rearwardly toward the outward side in the vehicle width direction.

Figure 7:
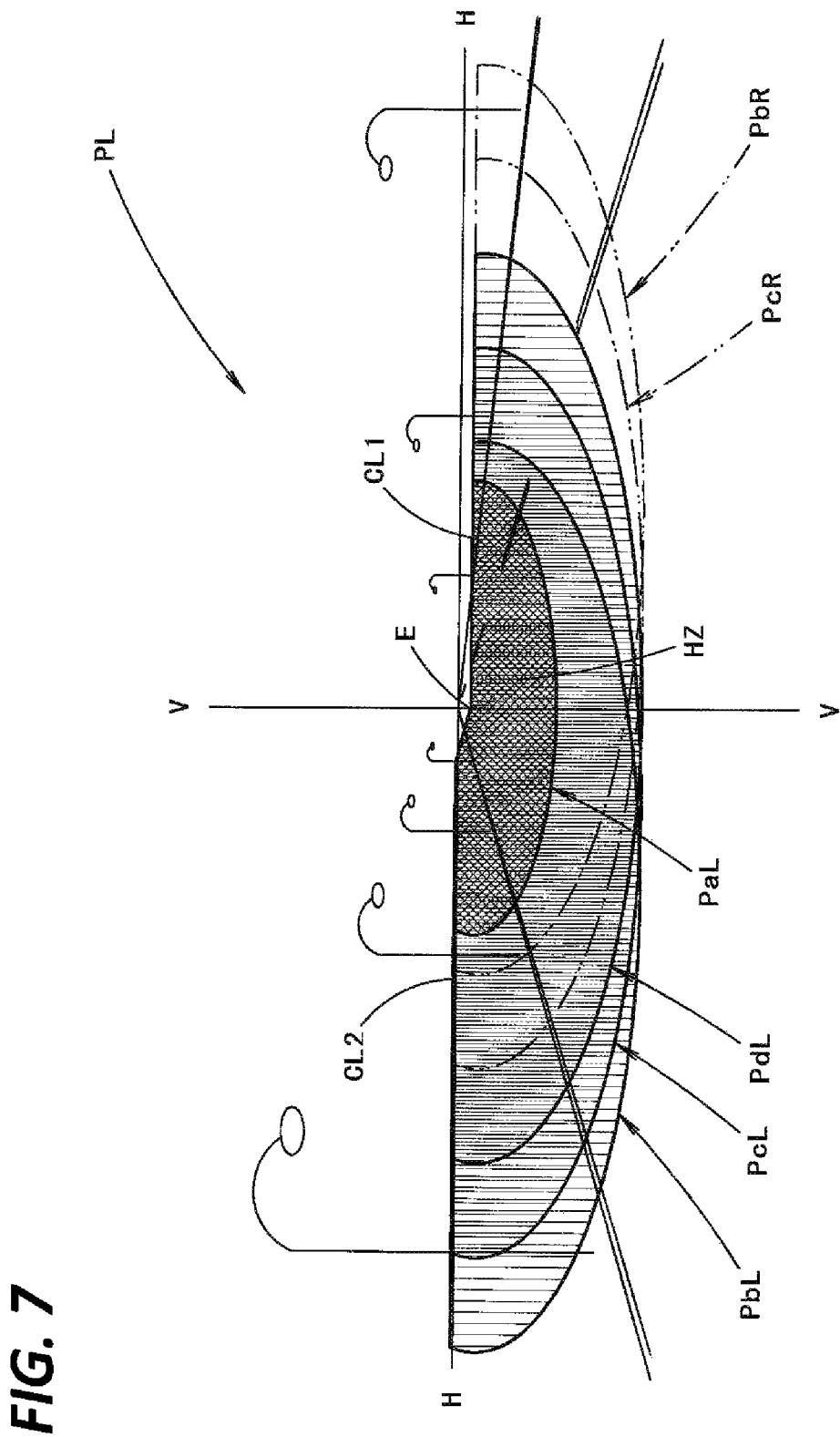
FIG. 7 is a view illustrating a light distribution pattern formed by irradiation light from the vehicle lamp.

FIG. 7 is a view illustrating a low beam light distribution pattern PL formed by light irradiated from the vehicle lamp 10 on a virtual vertical screen disposed at a position 25 m apart from the front side of the vehicle, in a transparent manner.

The low beam light distribution pattern PL is a low beam light distribution pattern of the left light distribution and has cutoff lines CL1 and CL2 of which the left and right stages at the top edge of the low beam light distribution pattern are different from each other. The cutoff lines CL1 and CL2 extend horizontally such that the left and right stages are different from each other on the basis of the line V-V as a boundary passing vertically through the vanishing point H-V in the forward direction of the lamp. The oncoming lane side which is rightward from the line V-V is formed as the low-stage cutoff line CL1, and the own lane side which is leftward from the line V-V is formed as the high-stage cutoff line CL2 of which the stage ascends from the low-stage cutoff line CL1 via an inclined section.

In the low beam light distribution pattern PL, an elbow point E which is an intersecting point of the low-stage cutoff line CL1 and the line V-V is located about 0.5° to 0.6° downwardly apart from the H-V.

The low beam light distribution pattern PL is formed as a synthesized light distribution pattern obtained by superposing four light distribution patterns PaL, PbL, PcL, and PdL on each other.

The light distribution pattern PaL is formed by light irradiated from the first lamp unit 20A, and the other three light distribution patterns PbL, PcL, and PdL are formed by light irradiated from the three second lamp units 20B, 20C, and 20D.

The light distribution pattern PaL is formed by projecting an image of the light source 42A of the first lamp unit 20A, which is formed on the surface of the rear focal point of the first projection lens 32A by the light emitted from the light source 42A and reflected by the reflector 44A, as an inversely projected image onto the virtual vertical screen, and the cutoff lines CL1 and CL2 are formed as an inversely projected image of the front edge of the upward reflecting surface 46Aa of the shade 46A. The other three light distribution patterns PbL, PcL, and PdL are also identically formed.

The light distribution pattern PaL is formed as a small bright horizontally long light distribution pattern. This light distribution pattern PaL is formed as a light distribution pattern which expands transversely equally with respect to the line V-V vertically passing through the vanishing point H-V in the forward direction of the lamp. This is because the optical axis Axa of the first lamp unit 20A extends in the front and rear direction of the vehicle.

All the other three light distribution patterns PbL, PcL, and PdL are formed as light distribution patterns which are not as bright as the light distribution pattern PaL but are larger and horizontally longer than the light distribution pattern PaL. This is because the convergence degree of the light reflected from the reflector 44C of the second lamp unit 20C (20B or 20D) is smaller than the convergence degree of the light reflected from the reflector 44A of the first lamp unit 20A.

These three light distribution patterns PbL, PcL, and PdL are formed as substantially identical light distribution patterns, but the formation positions thereof are deviated horizontally.

That is, the light distribution pattern PdL is formed as a light distribution pattern which expands transversely equally with respect to the line V-V. This is because the optical axis Axd of the second lamp unit 20D extends in the front and rear direction of the vehicle.

Meanwhile, the light distribution pattern PcL is formed at a position deviated in the leftward direction from the light distribution pattern PdL. This is because the optical axis Axc of the second lamp unit 20C is inclined in the leftward direction with respect to the optical axis Axd of the second lamp unit 20D.

In addition, the light distribution pattern PbL is formed at a position further deviated in the leftward direction from the light distribution pattern PcL. This is because the optical axis Axb of the second lamp unit 20B is further inclined in the leftward direction with respect to the optical axis Axc of the second lamp unit 20C.

As described above, the low beam light distribution pattern PL includes the small bright light distribution pattern PaL that expands transversely equally with respect to the line V-V, the large light distribution pattern PdL that expands transversely equally with respect to the line V-V, the light distribution pattern PcL that is deviated in the leftward direction from the light distribution pattern PdL, and the light distribution pattern PbL that is further deviated in the leftward direction from the light distribution pattern PcL. Hence, the low beam light distribution pattern PL is formed as a light distribution pattern having a high luminous intensity zone HZ in the forward direction of the lamp and less light distribution unevenness.

In addition, the low beam light distribution pattern which is formed in a vehicle unit is formed as a synthesized light distribution pattern between a low beam light distribution pattern formed by light irradiated from a vehicle lamp paired with the vehicle lamp 10 (i.e., a head lamp disposed at the right front end of the vehicle) and the low beam light distribution pattern PL. At this time, light distribution patterns substantially identical to the light distribution patterns PaL and PdL are formed at positions substantially identical to those of the light distribution patterns PaL and PdL, and light distribution patterns PbR and PcR (indicated by two dot chain lines in FIG. 7) are formed in the relationship in which the light distribution patterns PbR and PcR are substantially transversely symmetric to the light distribution patterns PbL and PcL with respect to the line V-V. Hence, the traveling road in front of the vehicle is transversely equally and widely irradiated.

Next, acting effects of the present exemplary embodiment will be described.

In the vehicle lamp 10 according to the present exemplary embodiment, the first optical unit 40A and the three second optical units 40B, 40C, and 40D are supported to the main bracket 50 supported to be vertically and transversely pivotable with respect to the lamp body 12. Accordingly, by pivoting the main bracket 50, the optical axis adjustment for the first optical unit 40A and the three second optical units 40B, 40C, and 40D may be collectively performed.

In addition, the vehicle lamp 10 according to the present exemplary embodiment includes the sub-bracket 60 supported to be vertically pivotable with respect to the main bracket 50, and is configured such that the first optical unit 40A is supported directly to the main bracket 50, and the three second optical units 40B, 40C, and 40D are supported to the main bracket 50 via the sub-bracket 60. Accordingly, the following acting effects may be obtained.

That is, by pivoting the sub-bracket 60, the vertical optical axis deviation between the first optical unit 40A and the three second optical units 40B, 40C, and 40D may be corrected. As a result, the main bracket 50 may be assembled in the lamp body 12 in a state where the optical axis adjustment for the first optical unit 40A and the three second optical units 40B, 40C, and 40D has been accurately performed.

At this time, although the optical axis adjustment for the three second optical units 40B, 40C, and 40D is collectively performed, even when an optical axis deviation occurs among the second optical units 40B, 40C, and 40D, the low beam light distribution pattern PL may be formed as a practically appropriate light distribution pattern because the light emitted from the first optical unit 40A forms the high luminous intensity zone HZ of the low beam light distribution pattern PL.

In addition, since the optical axis adjustment for the three second optical units 40B, 40C, and 40D is collectively performed, the necessity to secure the space for the pivoting of the individual second optical units 40B, 40C, and 40D among the second optical units 40B, 40C, and 40D may be eliminated. Accordingly, the spacing among the second optical units 40B, 40C, and 40D may be made narrow, and as a result, the compact vehicle lamp 10 may be implemented.

According to the present exemplary embodiment, in the vehicle lamp 10 provided with the plurality of optical units, the optical axis adjustment for the plurality of optical units may be accurately performed with the compact configuration.

In the present exemplary embodiment, since the three second optical units 40B, 40C, and 40D are arranged to irradiate light in horizontally deviated directions, respectively, the light distribution patterns PbL, PcL, and PdL formed by light irradiated from the three second optical units 40B, 40C, and 40D may expand horizontally, and as a result, the low beam light distribution pattern PL having a high forward visibility may be easily formed.

At this time, in the vehicle lamp 10 according to the present exemplary embodiment, since the second projection lenses 32B, 32C, and 32D are arranged in front of the second optical units 40B, 40C, and 40D in the state of being supported to the main bracket 50, it is required to maintain the incident position where the light emitted from each of the second optical units 40B, 40C, and 40D is incident on each of the second projection lenses 32B, 32C, and 32D to be as constant as possible, regardless of the pivoting state of the sub-bracket 60, in order to maintain the light distribution patterns PbL, PcL, and PdL in a substantially constant shape.

To this end, in the present exemplary embodiment, the sub-bracket 60 is pivoted with respect to the main bracket 50 about the axis perpendicular to the direction positioned in the middle of the three light irradiation directions from the three second optical units 40B, 40C, and 40D (specifically, in the extending direction of the optical axis Axc of the second projection lens 32) to extend horizontally, i.e., the pivoting axis Ax1. Hence, the incidence position where the light emitted from each of the second optical units 40B, 40C, and 40D is incident on each of the second projection lenses 32B, 32C, and 32D may be maintained as a substantially constant position.

As described above, in the present exemplary embodiment, the light emitted from the first optical unit 40A forms the high luminous intensity zone HZ which is the central area of the low beam light distribution pattern PL. Thus, even when an optical axis deviation occurs among the second optical units 40B, 40C, and 40D, the low beam light distribution pattern PL may be easily formed as a practically appropriate light distribution pattern while suppressing a glare from being given to, for example, an oncoming car driver.

In the above-described exemplary embodiment, descriptions have been made on the configuration in which the second lamp units 20D, 20C, and 20B are arranged such that the leftward inclination angles of the light irradiation directions thereof from the front side of the lamp increase in the order of the second lamp units 20D, 20C, and 20B (i.e., in the order of the second optical units 40D, 40C, and 40B). However, the arrangement may be appropriately changed.

In the above-described exemplary embodiment, descriptions have been made on the configuration in which the vehicle lamp 10 includes the three second lamp units 20B, 20C, and 20D. However, the vehicle lamp 10 may include two or four or more second lamp units.

In the above-described exemplary embodiment, descriptions have been made on the configuration in which the first lamp unit 20A and each of the second lamp units 20B, 20C, and 20D are projector-type lamp units including, for example, the reflectors 44A, and 44C. However, for example, a projector-type lamp unit which does not include, for example, the reflectors 44A and 44C (in this case, a light source itself constitutes the first optical unit or each of the second optical units) or a parabolic lamp unit (in this case, the lamp unit constitutes the first optical unit or each of the second optical units) may be adopted.

In the above-described exemplary embodiment, the vehicle lamp 10 for forming the low beam light distribution pattern PL has been described. However, the acting effects substantially identical to those of the above-described exemplary embodiment may also be obtained from a vehicle lamp for forming, for example, a high beam light distribution pattern.

Next, a modification of the above-described exemplary embodiment will be described.

Figure 8:
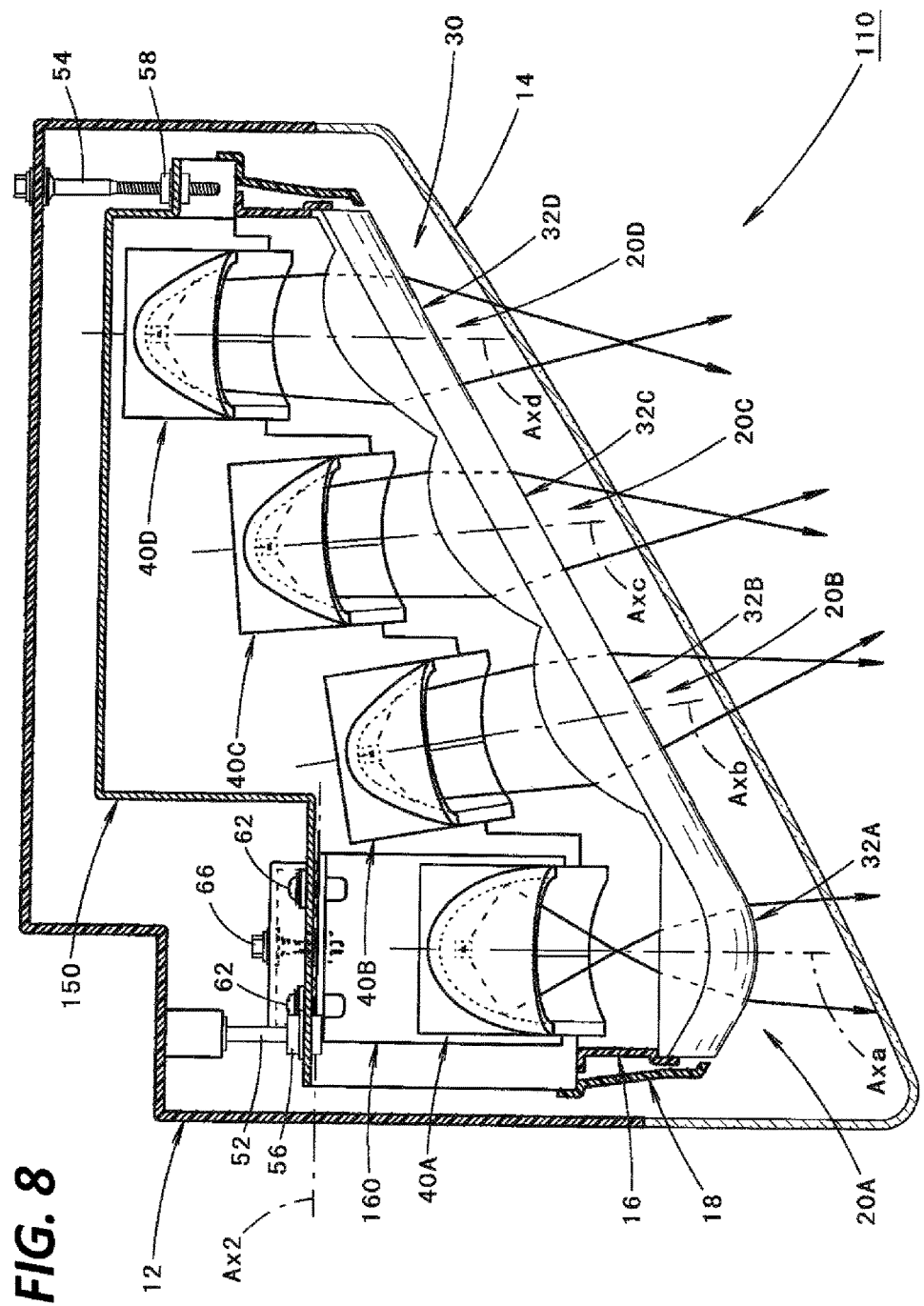
FIG. 8 is a view illustrating a modification of the exemplary embodiment, which is similar to FIG. 2.

FIG. 8 is a view illustrating a modification of the present exemplary embodiment in the same manner as FIG. 2.

As illustrated in FIG. 8, a vehicle lamp 110 is the same as that of the vehicle lamp 10 according to the above-described exemplary embodiment in the basic configuration but is different from the above-described exemplary embodiment in the configuration of the main bracket 150 and the sub-bracket 160.

That is, in the present modification as well, the main bracket 150 is pivotably supported to the lamp body 12, and the sub-bracket 160 is pivotably supported to the main bracket 150. However, the three second optical units 40B, 40C, and 40D are supported directly to the main bracket 150, and the first optical unit 40A is supported to the main bracket 150 via the sub-bracket 160.

In the present modification as well, the sub-bracket 160 is supported to be vertically pivotable with respect to the main bracket 150 about the horizontally extending pivoting axis Ax2. However, the pivoting axis Ax2 extends in a direction perpendicular to the optical axis Axa of the first projection lens 32A (i.e., in the vehicle width direction).

The sub-bracket 160 is screw-connected to the main bracket 150 by the screws 62 at two places positioned above the optical axis Axa and in the extending direction of the pivoting axis Ax2.

In addition, the adjusting screw 66 is provided at a position below the optical axis Axa to cause the sub-bracket 160 to be vertically pivoted with respect to the main bracket 150 about the pivoting axis Ax2.

When the configuration of the modification is adopted, the optical axis deviation between the first optical unit 40A and the three second optical units 40B, 40C, and 40D may also be corrected by pivoting the sub-bracket 160. Accordingly, the optical axis adjustment for the first optical unit 40A and the three second optical units 40B, 40C, and 40D may be accurately performed.

The numerical values described as the specifications of the above-described exemplary embodiment and modification are merely illustrative and may be set to appropriately different values.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a main bracket pivotably supported by a lamp body;
   a plurality of optical units supported by the main bracket and emitting light to form a predetermined light distribution pattern, the plurality of optical units including a first optical unit and a plurality of second optical units; and
   a sub-bracket supported to be pivotable vertically with respect to the main bracket about a horizontally extending pivoting axis,
   wherein
   the first optical unit is supported directly by the main bracket, and the plurality of second optical units are fixed to the sub-bracket and supported by the main bracket via the sub-bracket.

2. The vehicle lamp of claim 1, wherein the plurality of second optical units are arranged such that at least one of the second optical units irradiates light in a direction different from that of the other second optical units in a horizontal direction.

3. The vehicle lamp of claim 2, wherein
   a projection lens is disposed in front of each of the second optical units in a state of being supported by the main bracket, to cause light emitted from the corresponding second optical unit to be incident on the projection lens, and
   the sub-bracket is pivoted with respect to the main bracket about a pivoting axis which extends in a direction perpendicular to a direction positioned in the middle of a plurality of light irradiation directions from the plurality of second optical units.

4. The vehicle lamp of claim 1, wherein the light emitted from the first optical unit forms a central zone of the predetermined light distribution pattern.

5. The vehicle lamp of claim 2, wherein the light emitted from the first optical unit forms a central zone of the predetermined light distribution pattern.

6. The vehicle lamp of claim 3, wherein the light emitted from the first optical unit forms a central zone of the predetermined light distribution pattern.

7. The vehicle lamp of claim 4, wherein a low beam light distribution pattern is formed as the predetermined light distribution pattern.

8. The vehicle lamp of claim 5, wherein a low beam light distribution pattern is formed as the predetermined light distribution pattern.

9. The vehicle lamp of claim 6, wherein a low beam light distribution pattern is formed as the predetermined light distribution pattern.

10. The vehicle lamp of claim 1, wherein the plurality of second optical units are arranged to be displaced rearwardly with respect to the first optical unit.

11. The vehicle lamp of claim 1, wherein the main bracket is supported to be vertically and horizontally pivotable with respect to the lamp body, by a pivot disposed at a right upper side of the lamp body and two aiming screws disposed at a left side and a right lower side of the lamp body, respectively.

12. The vehicle lamp of claim 1, wherein the first optical unit and the plurality of second optical units are arranged horizontally to each other.

* * * * *